Aug. 19, 1958 R. ERXLEBEN 2,847,870
APPARATUS FOR CONTROLLING THE FUEL SUPPLY AND THE
REVERSING GEAR OF A MARINE ENGINE OPTIONALLY
BY DIFFERENT CONTROL MECHANISMS
Filed July 15, 1957 3 Sheets-Sheet 3

Inventor
REINHOLD ERXLEBEN
BY Dicke and Craig
ATTORNEYS.

United States Patent Office 2,847,870
Patented Aug. 19, 1958

2,847,870

APPARATUS FOR CONTROLLING THE FUEL SUPPLY AND THE REVERSING GEAR OF A MARINE ENGINE OPTIONALLY BY DIFFERENT CONTROL MECHANISMS

Reinhold Erxleben, Berlin-Steglitz, Germany, assignor to Daimler-Benz A. G., Stuttgart-Unterturkheim, Germany, a German stock company Application July 15, 1957, Serial No. 672,023

Claims priority, application Germany July 20, 1956

5 Claims. (Cl. 74—472)

My invention relates to an apparatus for controlling the fuel supply and the reversing gear of a marine engine optionally by different control mechanisms mounted at different locations on the ship.

It is the object of my invention to provide a control apparatus for this purpose which is simple and reliable in operation and does not depend on the availability of a source of compressed air for operation and is free of valves or other mechanisms which would complicate the structure and may give rise to a breakdown.

Further objects of my invention will appear from a detailed description of a preferred embodiment thereof following hereinafter with reference to the drawings. It is to be clearly understood, however, that my invention is in no way limited to the details of such embodiment but is capable of numerous modifications within the scope of the appended claims. Moreover it is to be understood that the terms and phrases used in such detailed description have been chosen for the purpose of explaning the invention rather than that of restricting or limiting same.

Figure 1:
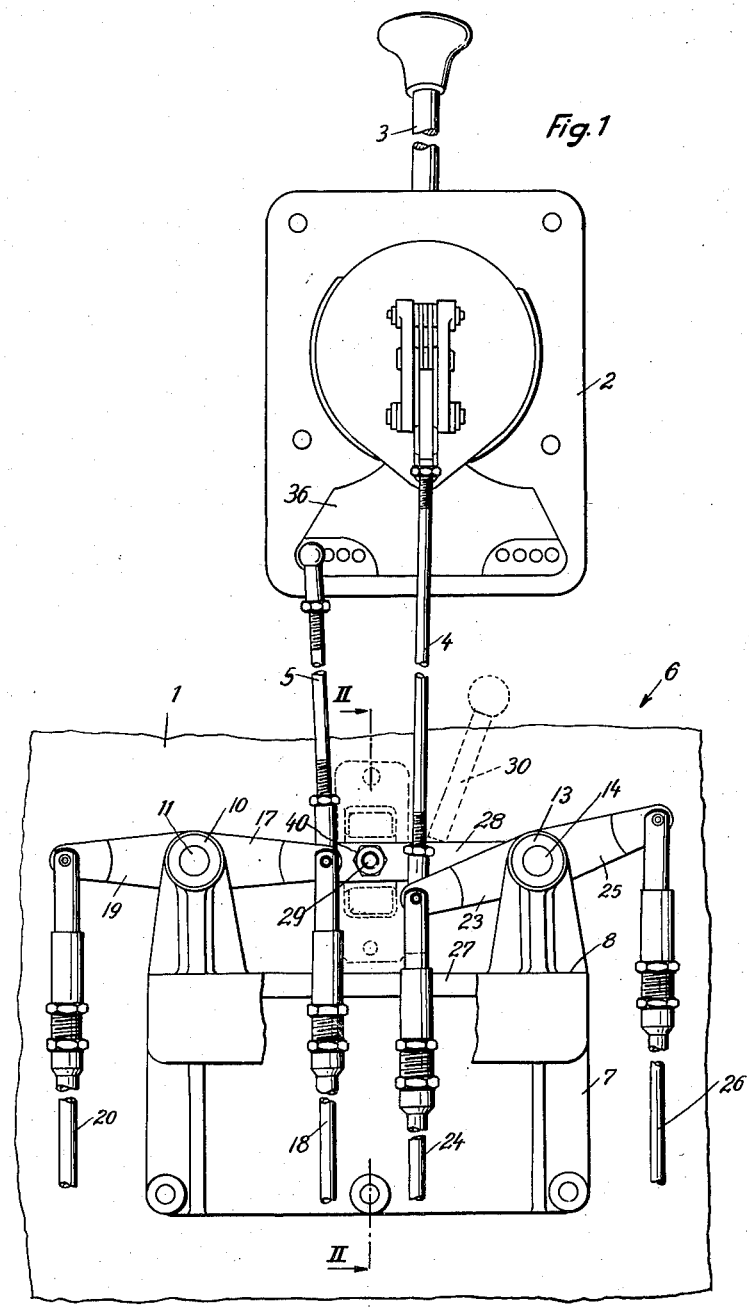
Fig. 1 is a front view of my novel apparatus for controlling the fuel supply and the reversing gear of a marine engine optionally by different control mechanisms, one of such control mechanisms being likewise shown in Fig. 1.

The apparatus illustrated in the drawings serves the purpose of controlling the fuel supply and the reversing gear of a marine engine (not shown) optionally either by the control mechanism 2 equipped with the control lever 3 or by another control mechanism not shown in the drawings and installed at some other point on the ship. The control mechanisms such as 2, 3 may be of the type shown and described in my co-pending patent application 592,159 filed on June 18, 1956, relating to "Control Mechanism for a Marine Diesel Engine." By suitable manipulation of the lever 3 the operator may actuate a link 4 for the adjustment of the control element of the fuel injection pump of the engine to thereby control the power produced by the engine and he may also actuate a link 5 serving to control the hydraulic servo-motor controlling the reversing clutch of the engine.

The ship is equipped with a second control mechanism installed on the ship at a remote point for controlling the engine and this second control mechanism may be similar to the mechanism 2, 3. It serves to actuate suitable linkage means, such as push-pull cables 20 and 26, the cable 20 serving to control the hydraulic servo-motor operating the reversing clutch of the engine and the cable 26 serving to adjust the fuel injection pump of the diesel engine. The apparatus described hereinafter serves the purpose of selecting one of the control mechanisms for operation, while disabling the other control mechanism.

A wall 1 forming part of the structure of the ship carries my novel apparatus 6, preferably provided at a short distance from the control mechanism 2, for instance beneath same. The apparatus includes an angular bracket 7 fixed to the wall and formed with a substantially horizontal supporting plate 8 carrying two pairs of spaced bearings 9, 10 and 12, 13. In the pair of bearings 9, 10 a horizontal shaft 11 is mounted for rotation and axial displacement. At substantially the same level a second shaft 14 extending parallel to the shaft 11 is journaled at a distance therefrom in the bearings 12, 13 for rotation and axial displacement. On each of the shafts 11 and 14 three arms are mounted between the bearings to be held therebetwen in nonshiftable condition. Thus, the arms 15, 17 and 19 are pivotaly mounted on shaft 11 between the bearings 9 and 10, whereas arms 21, 23 and 25 are pivotally mounted on shaft 14 between the bearings 12 and 13. The end of arm 15 is connected by a universal joint, preferably a ball joint, 16 with the link 5 of the control mechanism 2. The end of arm 17 is connected by a flexible push-pull cable 18 with the element controlling the hydraulic servo-motor of the reversing clutch of the engine. The end of arm 19 is connected by a flexible push-pull cable 20 with the second control mechanism not shown. The free end of arm 21 is connected by a universal joint, such as a ball joint 22, with the link 4 coordinated to the control mechanism 2 and serving to effect the power control of the engine. The free end of lever 23 is connected by a suitable joint with a flexible push-pull cable 24 extending to the element adjusting the fuel injection pump of the engine. The end of the arm 25 is connected to a flexible push-pull cable 26 leading to the second control mechanism, not shown, and corresponding to the link 4 in that it serves to control the power of the engine. The arms 15 and 21 when in normal postion point towards each other. The same applies to the arms 17 and 23, whereas the arms 19 and 25 point in opposite directions.

The cables 18 and 24 extend through a suitable aperture 27 provided in the horizontal supporting plate 8.

Figure 2:
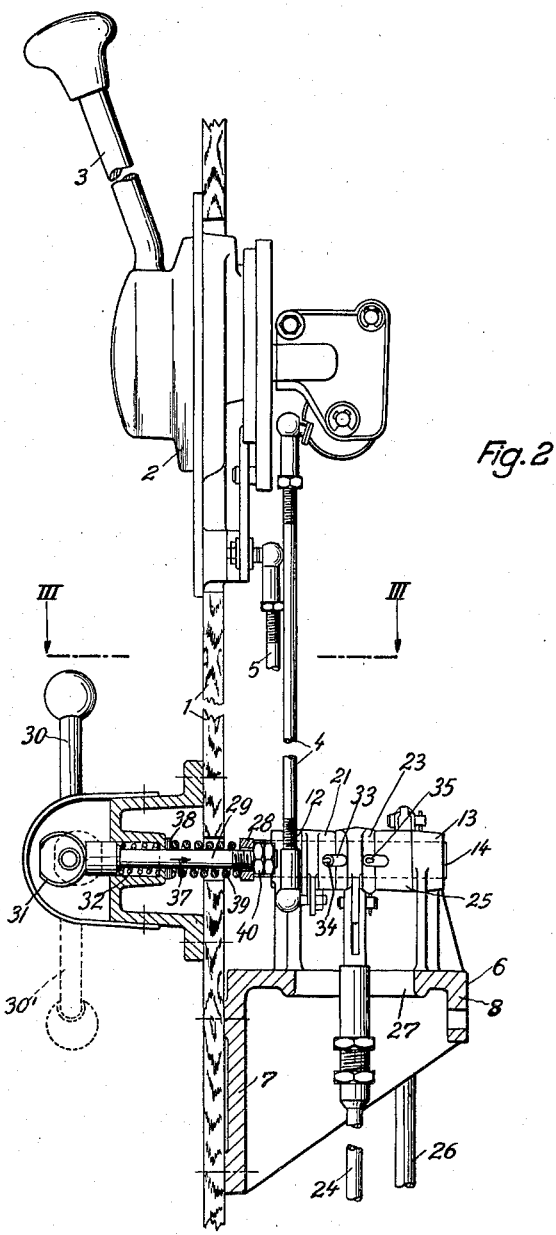
Fig. 2 is a side view of the apparatus shown in Fig. 1, partly shown in a section along the section line I—I indicated in Fig. 1
Figure 3:
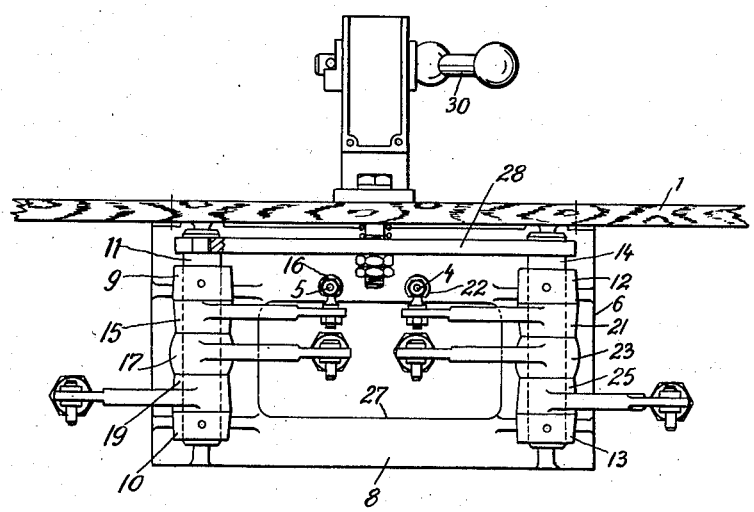
Fig. 3 is a plan view of the connecting unit shown in the lower portion of Fig. 2 viewed in the direction of the arrows III—III of Fig. 2.

A substantially horizontal bar 28 extending transversely to the shafts 11 and 14 is connected with the inner ends thereof. For this purpose each of the shafts 11 and 14 has an inner end section of reduced diameter extending through an aperture of the bar 28 and, on its end carries a suitable nut or washer or the like engaging the side face of the bar 28. The bar 28 constitutes a manually operable member for axially displacing the shafts 11 and 14 in unison optionally into a first position or into a second position. On the shafts 11 and 14 and on the arms carried thereby suitable means to be described hereinafter are provided for connecting the pair of arms 17 and 23 either with the pair of arms 15 and 21, when the shafts 11 and 14 are axially shifted to a first position, or with the pairs of arms 19 and 25, when the shafts 11 and 14 have been shifted axially into a second position. Such means comprises pins 34 and 35 projecting inwardly from each of the shafts 11 and 14 and rigidly connected therewith and grooves 33 and 35. As shown in Fig. 2, the hub member of arm 23 is provided with a groove 33 extending to the one end face thereof and with a groove 35 extending to the other end face of the hub member. The same applies to the hub member of arm 17. Similar grooves are provided in the adjoining ends of the two hub members of the arms 21 and 25 and of the arms 15 and 19. In one axial position of the shaft 14 illustrated in Fig. 2 the pins 34 and 35 engage the grooves of the hub members 21 and 23 and the corresponding pins of shaft 11 engage the grooves of the hub members 15 and 17. When the bar 28 is shifted in the direction of the arrow 37, Fig. 2, into the other end position, however, the pins 34 and 35 will engage the grooves of the hubs of the arms 23 and 25 and the corresponding pins of shaft 11 will engage the grooves provided in the hub members of the arms 17 and 19.

In the embodiment shown the means for manually operating the bar 28 includes a horizontal shaft journaled in a suitable bracket fixed to the wall member 1, preferably on the face thereof opposite to that carrying the bracket 7. A shaft 30 and a cam 31 are fixed to said shaft. The cam 31 cooperates with a cam follower formed by a rod 29 extending parallel to the shafts 11 and 14 and mounted in the bracket for axial displacement. The rod 29 extends through an opening of the wall member 1 and through an aperture provided in the bar 28 and on its end carries a pair of nuts 40. A helical spring 39 surrounds the rod 29 and its ends bear against the bar 28 and against a pin 38 inserted in the rod 29 transversely of the latter. A second helical spring 32 surrounding the rod 29 is braced against the bracket and bears against a head of the rod 29 tending to keep such head in contact with the cam.

The operation of the control apparatus described is as follows:

When the operator swings the lever 3 towards or away from the wall member 1, the link 4 will be displaced downwardly or upwardly and will impart pivotal motion to the arm 21. Let it be assumed that the handle 30 assumes the position illustrated in Fig. 2 causing the pin 34 to engage the groove of the hub member of arm 21. Therefore, the pivotal movement of the arm 21 will be transferred to the shaft 14. The pin 35 of shaft 14, however, imparts the pivotal movement to the arm 23 and the latter actuates the push-pull cable 24 to adjust the power of the engine accordingly.

When the operator swings the handle 3 of the control mechanism 2 in a direction parallel to the wall member 1, this will lift or lower the link 5. As a result, a pivotal movement will be imparted to the arm 15. Owing to the engagement of pins, corresponding to pins 34 and 35, of shaft 11 with grooves provided in the hub members of the arms 15 and 17, the pivotal movement will be imparted to the arm 17, whereby the flexible push-pull cable 18 will be actuated and will cause the reversing gear to be shifted to "forward" or "rearward" as desired. When the operator wishes to disable the control mechanism 2 and to control the engine by means of the other control mechanism not shown, he will move the handle 30 into the position 30' shown in dotted lines in Fig. 2. Preferably, suitable stops not shown are provided for limiting the pivotal movement of the handle 30 in the position shown in full lines and in the position shown in dotted lines at 30'. Owing to the operation of the handle 30 the cam 31 will be brought into the dotted position moving the rod 29 contrary to the tendency of spring 32 in the direction of the arrow 37, whereby the spring 39 will be biased and will tend to move the bar 28 and the shafts 11 and 14 connected therewith towards the right with reference to Fig. 2 into a position in which the pins 34 and 35 will engage the grooves provided in the hub portions of arms 23 and 25. This axial displacement of the shafts is possible only, if the grooves are in registry with the pins. As a result, it is practically possible in any position of operation to shift the connection of the control apparatus 6 from one control mechanism, such as 2, to the other. After the shifting operation has been completed, the engine may be controlled by suitable manipulation of the second control mechanism not shown. When the control elements assume corresponding positions, the connecting apparatus will effect the shifting operation automatically. As will appear from Fig. 2, the cam 31 is provided with a flat face, whereby the cam follower will tend to maintain handle 30 in its adjusted position so that it will stay put. This will prevent an accidental displacement of the handle 30, since the spring 32 presses the cam follower 29 against the flat face of the cam 31.

When the handle is restored to the position 30 to thereby connect the apparatus 6 with the control mechanism 2 the cam 31 will release the rod 29 permitting the spring 32 to press the rod 29 outwardly. The nuts 40 mounted on the rod 29 will return the bar 28 to the position illustrated in the drawings. As a result, the pins 34, 35 and the corresponding pins provided on the shaft 11 will engage the grooves of the arms 21, 23 and of the arms 15, 17.

From the above description it will appear that the various arms mounted on the shafts 11 and 14 constitute three pairs of arms, each pair being comprised of one arm mounted on one of the shafts and another arm mounted on the other one of said shafts; that the linkage means 4, 5 connect the arms 15 and 21 of a first one of said pairs with the control mechanism 2; that linkage means 20 and 26 connect the arms 19 and 25 of a second one of said pairs with another control mechanism (not shown); and that linkage means, such as 18 and 24, connect the arms 17 and 23 of a third one of said pairs with the fuel supply control member and the reversing gear control of the engine; and that the third one of said pairs of arms 17 and 23 is mounted on the shafts 11 and 14 between the first pair of arms 15, 21 and the second pair of arms 19, 25.

Moreover, it will appear that my invention relates to an apparatus for controlling marine engines and, more particularly, the power control member and the reversing gear thereof, permitting such control optionally by one or the other of two control mechanisms mounted at locations remote from each other, the control being effected by means of linkages, flexible cables or the like, whereby all operations may be effected required for shifting the reversing gear and adjusting the power of the engine. Preferably, the connecting apparatus 6 is mounted at such a distance from the control mechanism 2 that its handle 30 may be conveniently operated by the same operator which manipulates the handle 3.

My novel apparatus 6, whereby the power control element and the servo-motor controlling the reversing gear of the marine engine may be optionally connected with one or the other of a pair of control mechanisms, includes simple mechanical elements only and is free from pneumatically operable mechanisms requiring the provision of valves or the like. Therefore, my invention is applicable to marine vessels of older types in which a source of compressed air is not available. Because of the great simplicity of the apparatus its maintenance and any repair that may become necessary can be carried out easily and does not require any specific tools.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Apparatus for controlling the fuel supply and the reversing gear of a marine engine optionally by different control mechanisms comprising a support, a pair of parallel shafts, two pairs of spaced bearings mounted on said support for journalling said shafts for rotary and axial displacement, a manually operable member connected with both of said shafts for axially displacing same in unison optionally into a first position or into a second position, arms mounted on said shafts between said bearings to be non-shiftable in axial direction constituting at least three pairs of arms, each pair being comprised of one arm mounted on one of said shafts and another arm mounted on the other one of said shafts, linkage means for connecting the arms of a first one of said pairs with one of said control mechanisms, linkage means for connecting the arms of a second one of said pairs with another one of said control mechanisms, linkage means for connecting the arms of a third one of said pairs with a fuel supply control member and a reversing gear control member of said engine, and means provided on said shafts and said arms for connecting said third one of said pairs of arms either with the first one of said pairs of arms when said shafts are in said first position or with the second one of said pairs of arms when said shafts are in said second position.

2. Apparatus as claimed in claim 1 in which said third one of said pairs of arms is mounted on said shafts between the first one and the second one of said pairs of arms.

3. Apparatus as claimed in claim 1 in which the arms of said first one of said pairs are mounted on said shafts so as to point towards each other, whereas the arms of said second one of said pairs are mounted on said shafts so as to point in opposite directions.

4. Apparatus as claimed in claim 1 in which said means provided on said shafts and said arms are constituted by pins projecting from said shafts and by grooves provided on said arms for engagement with said pins.

5. Apparatus as claimed in claim 1 in which said manually operable member connected with both of said shafts for axially displacing same in unison comprises a bar connected with said shafts for axially displacing same in unison, said apparatus further comprising a manually rotatable cam, a cam follower cooperating with said cam and movable by the latter in the direction of said displacement, a spring inserted between said cam follower and said bar for displacing said bar in one direction and means on said cam follower for displacing said bar in the opposite direction.

No references cited.